Oct. 8, 1968

J. L. CREAGER 3,404,935

DUAL PLANE ADJUSTABLE AUTOMOBILE MIRROR

Filed Nov. 23, 1964

INVENTOR.
JAMES L. CREAGER,

BY
Yungblut, Melville, Strasser and Foster

ATTORNEYS.

United States Patent Office 3,404,935
Patented Oct. 8, 1968

3,404,935
DUAL PLANE ADJUSTABLE AUTOMOBILE MIRROR
James L. Creager, 36 Kenner St., Ludlow, Ky. 41016
Filed Nov. 23, 1964, Ser. No. 413,226
5 Claims. (Cl. 350—303)

ABSTRACT OF THE DISCLOSURE

A dual plane adjustable mirror structure comprising a mirror frame of general rectangular configuration mounting a primary mirror surface and an angularly related secondary mirror surface horizontally disposed along the uppermost part of the mirror frame, the mirror frame having a circular well therein, a hub which is received in the well and which rotatably mounts the mirror frame for rotation about the axis of the hub, attachment means for rotatably securing the hub in the well, the attachment means including an attachment bolt and means for effecting limited lateral movement of the bolt relative to the mirror frame to effect non-binding engagement of the hub in the well, a mounting member for the mirror frame, and means pivotally connecting the mirror frame to the mounting member, the means pivotally connecting the mirror frame to the mounting member engaging the hub at a point offset with respect to the axis of the hub, whereby proper adjustment of both mirror surfaces may be achieved by first adjusting the primary mirror surface by rotating the mirror frame about the axis of the primary mirror surface, and then rotating the mirror frame about the axis of the hub so as to bring the secondary mirror surface into a horizontally disposed position without displacing the primary mirror surface from its adjusted position.

---

This invention relates to automobile mirrors of the type adapted to be mounted on the outside of the vehicle body in a location which will afford the driver a view of vehicles approaching from the rear. More specifically, the instant invention contemplates a dual plane mirror having a first or primary mirror surface adapted to provide the driver with a view of vehicles approaching from the rear, the device having a second or secondary mirror surface angularly related to the primary mirror surface and oriented so as to provide the driver with a wide angle view laterally of the driver's vehicle so as to detect a passing vehicle which has passed beyond the field of view of the primary mirror.

While various forms of dual plane mirrors have hitherto been proposed, their effectiveness has been limited due to size restrictions and limited adjustability. For example, if a conventional circular mirror is divided into dual planes, the effective size of each mirror plane is materially reduced to the extent that the field of either mirror is materially restricted unless the size of the mirror is substantially increased. Such increased size is objectionable from an appearance standpoint. This is true even in conventional single plane mirrors, and to afford greater adjustability without unduly increasing the size of the mirror, most mirrors are mounted off-center with respect to their mounting bracket so that the user, by rotating the mirror, may displace it in an orbital path relative to the mounting bracket. The field of vision is further enhanced by making the mirror of generally rectangular configuration rather than circular. Thus, by employing a combination of an off-center or eccentric mounting of the mirror frame relative to its mounting bracket, and by utilizing a rectangular mirror, the user is afforded a larger field of view together with the ability to more readily adjust the mirror to his line of sight. Most such mirrors embody a ball and socket or universal joint type of mounting so that the plane of the mirror may be adjusted to any desired angle.

While from the foregoing it would seem readily possible to provide a dual plane mirror which is of general rectangular configuration, thereby overcoming the size limitations of the circular mirror, and provide maximum adjustability by mounting the mirror frame off-center with respect to its mounting bracket, complications arise which cannot be solved by any known mirror construction. If the dual plane mirror is constructed with the secondary mirror surface uppermost, i.e., horizontally disposed along the uppermost part of the frame, adjusting movement of the mirror frame effective to bring the primary mirror surface into proper adjustment may very well require rotation of the mirror frame relative to the mounting bracket, thereby causing the secondary mirror surface to be displaced from its horizontally disposed position of use. Consequently, once the desired angular position of the primary mirror surface has been established, it then becomes necessary to upright the mirror frame so that the secondary mirror surface is uppermost and horizontally disposed. Such movement is extremely difficult to effect due to the fact that the proper angular adjustment of the primary mirror surface can be maintained only by rotating the mirror frame about the axis of the primary mirror surface, and the mirror farme is not mounted on the axis of the pimary mirror surface but rather on an axis which is eccentric or offset with respect to the axis of the primary mirror surface. Consequently, when it is sought to rotate the mirror frame so as to bring the secondary mirror surface into a horizontally disposed position, the primary mirror surface will be displaced from its adjusted position; and the user may spend a considerable length of time seeking to obtain the proper adjustment of both mirror surfaces.

In order to overcome the foregoing difficulties, the instant invention contemplates a dual plane mirror construction wherein adjustment means are provided which permit the mirror frame to be readily rotated about the axis of the primary mirror plane independently of the adjustment of the mirror frame as effected by means of its off-center ball and socket connection to the mounting bracket.

A further object of the instant invention is the provision of an adjustable dual plane mirror having a primary adjustment means in the form of a universal joint or ball and socket connection to the arm of a mounting bracket for the mirror frame, which connection is offset with respect to the center of the mirror frame, in combination with a secondary adjustment means in the form of a hub member which rotatably mounts the mirror frame for movement relative to the universal joint, the arrangement being such that the mirror frame may be rotated relative to the hub in a plane corresponding to the plane of the primary mirror surface.

Still a further object of the instant invention is the provision of an adjustable dual plane mirror of the character described wherein the hub member is formed so as to provide an integral ball portion offset from the axis of the hub, and wherein the mirror frame incorporates mounting means which mount the frame for non-binding movement relative to the hub, the frame having a well therein in which the hub is received.

3

The foregoing together with other objects of the invention which will appear hereinafter or which will be apparent to the skilled worker in the art upon reading this specification, are accomplished by that construction and arrangement of parts of which an exemplary embodiment shall now be described.

Reference is made to the accompanying drawings wherein.

Figure 1:
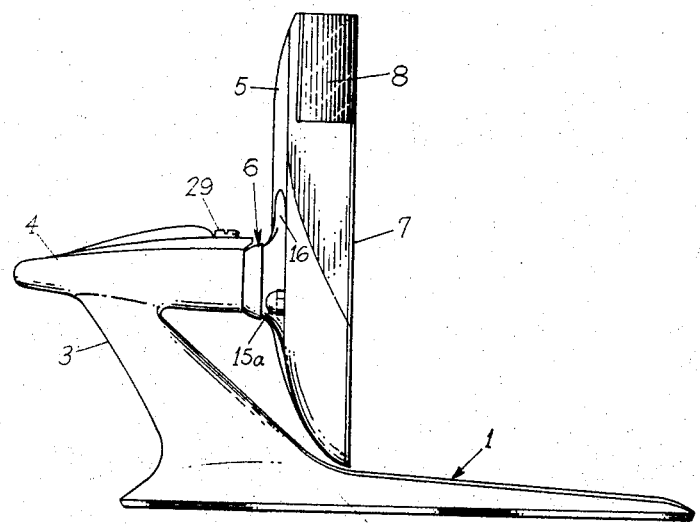
FIGURE 1 is a side elevational view of a dual plane adjustable mirror and associated mounting bracket in accordance with the invention.
Figure 2:
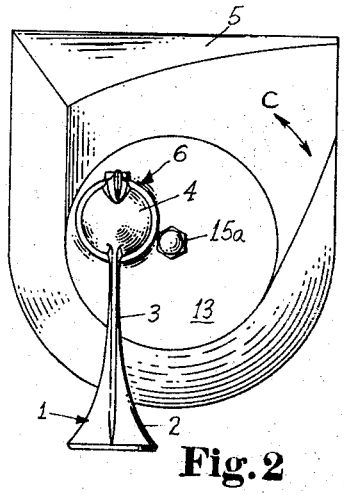
FIGURE 2 is a rear elevational view of the device.

Referring now to FIGURES 1 and 2 of the drawings, the device comprises a mounting member 1 having a base 2 adapted to be secured to the body of the automobile, the base having an upwardly projecting neck portion 3 terminating in a mounting arm 4. At the outset, it will be understood that the configuration of the mounting member does not constitute a limitation on the invention and may comprise any suitable bracket means incorporating an arm capable of adjustably mounting a mirror frame.

The mirror frame 5 is secured to the mounting arm 4 by means of a ball joint connection indicated generally at 6; and it will be understood that the mirror frame will mount a primary mirror 7 and an angularly related secondary mirror 8, both of which are preferably planar. The relative positions of the primary and secondary mirrors will be such that the driver's line of sight will follow the path of the arrow A when using the primary mirror 7, whereas when it is desired to determine whether or not a vehicle is attempting to pass the driver's line of sight will follow the arrow B, thereby enabling the driver to detect a vehicle which has passed beyond the field of view of the primary mirror 7.

It will be noted that the mirror frame 5 is of what may be characterized as generally rectangular configuration, thereby providing a relatively large primary mirror. The secondary mirror is of elongate rectangular configuration and positioned to overlie the primary mirror, the secondary mirror being horizontally disposed and extending across the top of the mirror frame.

Figures 4, 5:
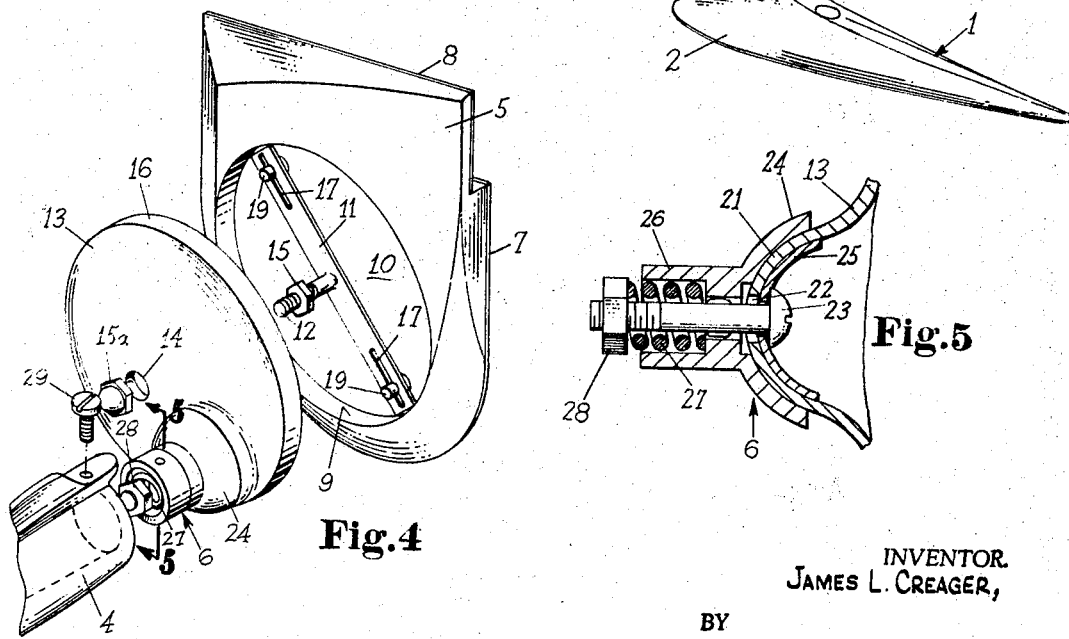
FIGURE 4 is an exploded view illustrating the mirror frame and the manner in which it is mounted to the hub.
FIGURE 5 is an enlarged fragmentary vertical sectional view taken along the line 5—5 of FIGURE 4 illustrating the construction of the ball joint.

As best seen in FIGURE 4, the rear surface of the frame 5 is provided with a circular well 9 the center line of which corresponds to the center of primary mirror 7. The bottom 10 of the well 9 is provided with a centering bar 11 mounting a threaded attachment bolt 12 which projects outwardly from the well at its center, the longitudinal axis of the bolt 12 being perpendicular to the bottom of the well which, in turn, parallels the planar face of primary mirror 7.

The attachment bolt 12 is adapted to receive the hub 13 which has a centrally disposed opening 14 through which the bolt 12 is adapted to pass, the hub being secured to the bolt by means of inner and outer nuts 15 and 15a. The hub has an annular flange 16 which is adapted to be received in the well 9 with the flange 16 lying in close proximity to the annular wall surface of the well.

Figures 3, 6:
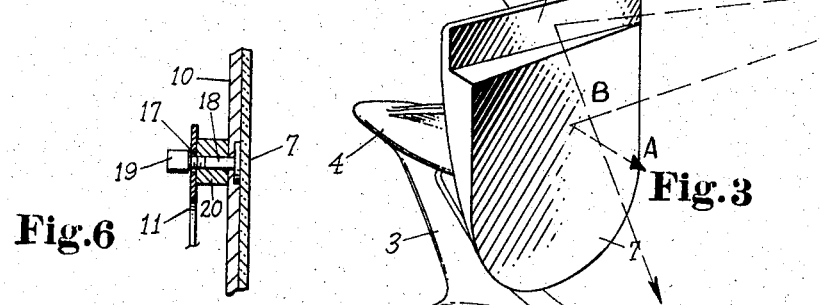
FIGURE 3 is a perspective view of the device.
FIGURE 6 is a fragmentary cross sectional view of a portion of the attachment means shown in FIGURE 4.

The centering bar 11 assures non-binding engagement of the hub in the well in that the centering bar has elongated slots 17 at its opposite ends which engage posts 18 which, as best seen in FIGURE 6, have enlarged heads 19 lying on the outermost side of the bar 11 and spacer studs 20 lying on the inner side of the bar, the bar thereby being free for limited axial movement which creates sufficient movement or play in the mounting of the hub to permit it to rotate within the well without binding.

As best seen in FIGURE 5, the hub is provided with an integral rounded ball portion 21 which effectively serves as a ball member forming a part of the ball joint 6. The ball portion is offset from the center of the hub and hence provides an eccentric mounting for the mirror frame. In the exemplary arrangement shown, the ball portion 21 has an enlarged opening 22 therein through which a threaded bolt 23 passes, the bolt also passing through a pair of cup-shaped members 24 and 25 lying on opposite sides of the ball portion 21, the arrangement being such that the ball portion may be moved relative to the cup-shaped members. The parts are held in assembled relation by means of a collar 26 which surmounts bolt 23 and spring 27 which is held in compressed condition by means of the nut 28. The spring acts to yieldably maintain the cup-shaped members 24 and 25 in frictional engagement with the opposite surfaces of the ball portion 21; yet the ball portion may be caused to pivot in the manner of a ball joint connection, thereby effecting pivotal movement of the hub and the mirror frame attached thereto.

As seen in FIGURE 4, the collar 26 is adapted to be received in the open end of the mounting arm 4 where it is locked in place by means of the set screw 29.

As should now be apparent, the entire mirror frame, including the hub 13 may be pivoted relative to the mounting arm until the primary mirror 7 is brought into proper alignment. If such alignment results in the secondary mirror 8 being inclined from its normal horizontally disposed operative position, the user has merely to rotate the mirror frame 5 relative to the hub 13, as indicated by the arrow C in FIGURE 2, to bring the entire frame to the upright position in which the secondary mirror extends across the top of the mirror frame and is horizontally disposed.

Modifications may be made without departing from the spirit and purpose of the invention. For example, the specific ball joint connection between the hub and mounting member illustrated in the drawings is exemplary only and different forms of universal or ball joint connections may be employed. The precise configuration of the mirror frame does not constitute a limitation on the invention and it may be of any shape desired, although a general rectangular configuration is preferred in that it provides an enlarged viewing area. Similarly, the relative sizes of the primary and secondary mirror surfaces may be varied as desired.

The embodiments of the invention in which an exclusive property or privilege is claimed are defined as follows:

1. A dual plane adjustable mirror structure comprising a mirror frame of general rectangular configuration mounting a primary mirror surface and an angularly related secondary mirror surface horizontally disposed along the uppermost part of said mirror frame, said mirror frame having a circular well therein, a hub which is received in said well and which rotatably mounts said mirror frame for rotation about the axis of said hub, attachment means for rotatably securing said hub in said well, said attachment means including an attachment bolt and means for effecting limited lateral movement of said bolt relative to said mirror frame to effect non-binding engagement of said hub in said well, a mounting member for said mirror frame, and means pivotally connecting said mirror frame to said mounting member, said last named means engaging said hub at a point offset with respect to the axis of said hub, whereby proper adjustment of both mirror surfaces may be achieved by first adjusting the primary mirror surface by rotating said mirror frame about the axis of the primary mirror surface and then rotating said mirror frame about the axis of said hub so as to bring the secondary mirror surface into a horizontally disposed position without displacing the primary mirror surface from its adjusted position.

2. The mirror structure claimed in claim 1, wherein the axis of said hub is centrally disposed with respect to said primary mirror surface and extending normal thereto.

3. The mirror structure claimed in claim 2, wherein the means pivotally connecting said mirror frame to said mounting member comprises a ball joint connection.

4. The mirror structure claimed in claim 3 wherein said hub has an integral hollow ball portion formed therein, and wherein said ball point connection includes cup-shaped members frictionally engaging the inner and outer surfaces of said hollow ball portion.

5. The mirror structure claimed in claim 4 including spring means urging said cup-shaped members into frictional engagement with said hollow ball portion.

References Cited

UNITED STATES PATENTS

| | | | |
|---|---|---|---|
| 2,604,818 | 7/1952 | Morgenstern | 248—483 |
| 2,726,575 | 12/1955 | Koonter | 248—483 |
| 2,895,380 | 7/1959 | Kurlytis | 350—304 |
| 2,990,751 | 7/1961 | Miller | 350—304 |

JEWELL H. PEDERSEN, *Primary Examiner.*

W. L. SIKES, *Assistant Examiner.*